United States Patent [19]
Bundschuh

[11] 3,930,773
[45] Jan. 6, 1976

[54] MACHINE FOR MAKING CINNAMON ROLLS AND THE LIKE

[76] Inventor: Harry H. Bundschuh, 2404 Denver, San Diego, Calif. 92110

[22] Filed: May 31, 1974

[21] Appl. No.: 475,205

[52] U.S. Cl. ............................ 425/133.1; 425/131.1
[51] Int. Cl.² ..................................... A21C 11/18
[58] Field of Search ................. 425/131.1, 133.1

[56] References Cited
UNITED STATES PATENTS

| | | | |
|---|---|---|---|
| 2,905,110 | 9/1959 | Bundshuh | 425/288 |
| 2,982,231 | 5/1961 | Fries | 425/131.1 |
| 3,286,661 | 11/1966 | Bundshuh | 425/287 |
| 3,314,381 | 4/1967 | Fries | 425/131.1 |

Primary Examiner—Ronald J. Shore
Assistant Examiner—David S. Safran
Attorney, Agent, or Firm—Ralph S. Branscomb

[57] ABSTRACT

A machine for making cinnamon rolls and the like with dough fed from a reciprocating hopper through forms inside dough discharge outlets to provide a simple spiral, or other, configuration into expressed dough, the forms having tubular portions through which flavoring material is added, a cut-off knife reciprocating across the discharge outlets determining the thickness of the individual rolls which drop onto a removable pallet or moving belt for transfer thereof to an electronic oven or its equivalent.

3 Claims, 5 Drawing Figures

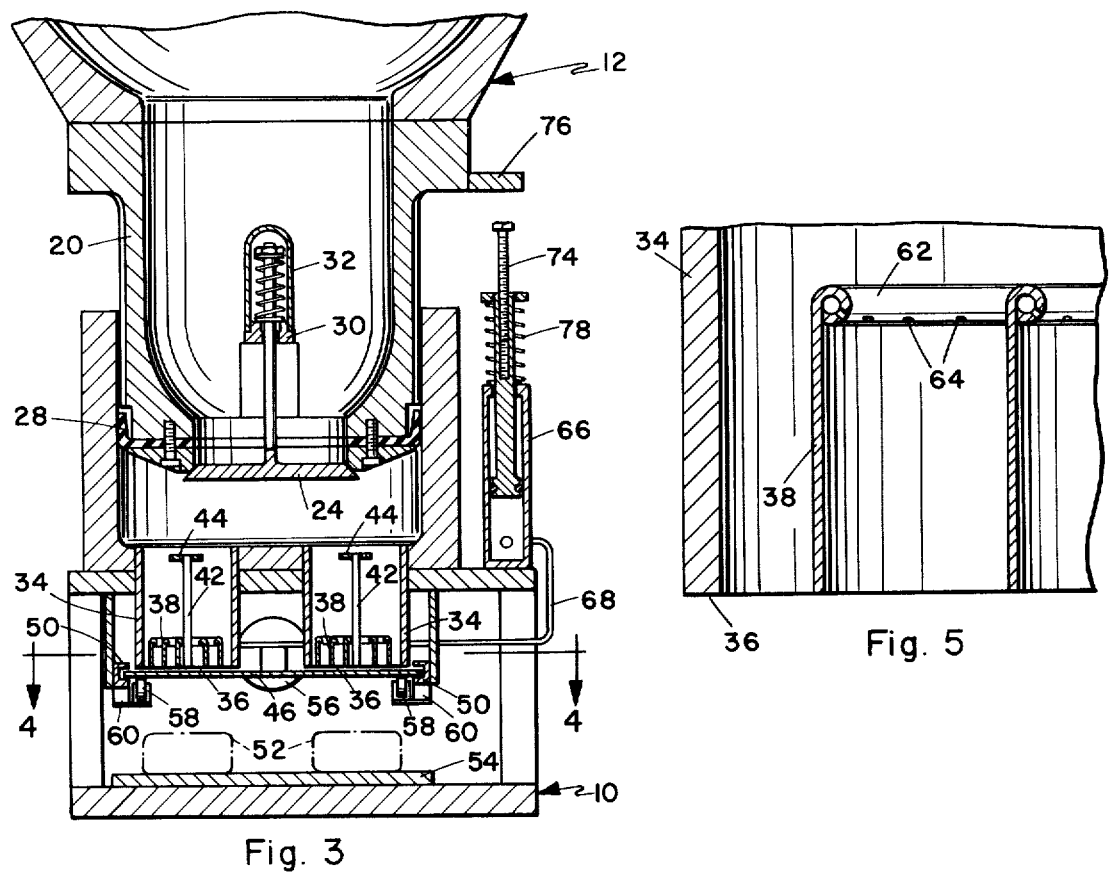
Fig. 3
Fig. 5
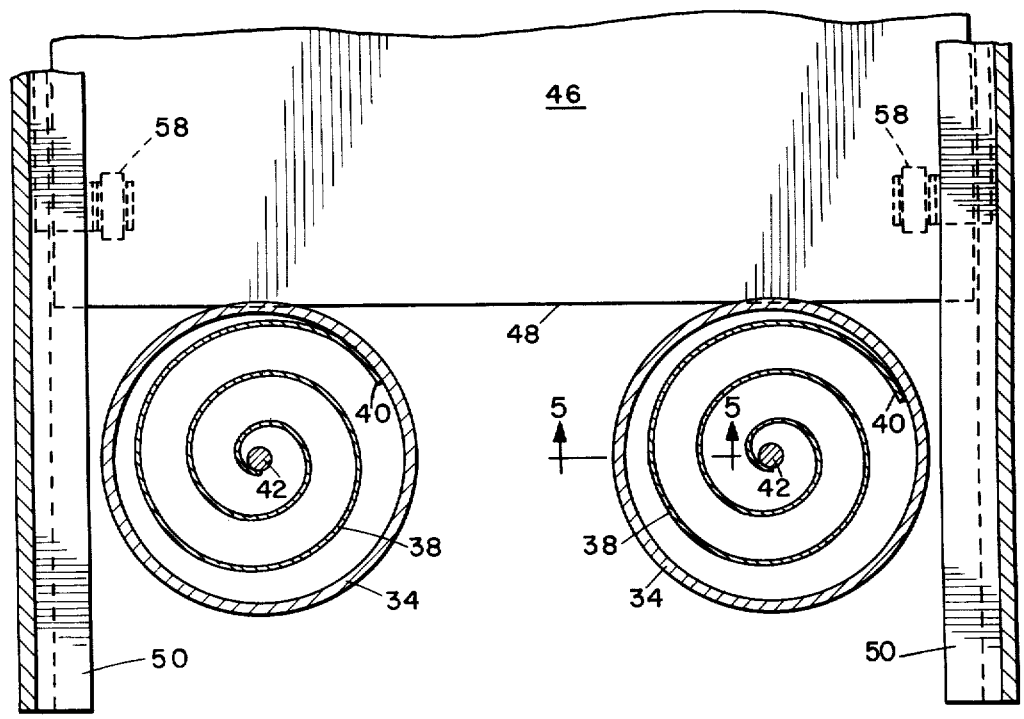
Fig. 4

MACHINE FOR MAKING CINNAMON ROLLS AND THE LIKE

BACKGROUND OF THE INVENTION

Cinnamon rolls, snail rolls, whirls and honey twists have long been made, after the dough has been prepared, by forming the dough into a flat rectangle, the cinnamon or other flavoring added, rolling the rectangle into a long spiral and then sliced into discs for baking. Prior art forming means include the well known variously configured tips for piston type cake decorators and cookie cutters and applicant's own patented doughnut making machine disclosed in U.S. Pat. No. 2,905,110 and U.S. Pat. No. 3,286,661. There is a need, however, for a machine capable of rapid and economical handling of the dough for sweet roll making on a commercial scale.

SUMMARY OF THE INVENTION

As claimed herein, this invention meets the immediately above mentioned need being, in brief, a means for hoppering a supply of dough and forcing this dough in small increments through forming means configured as desired, as for example a simple spiral, with the forming means including means to distribute flavoring material such as liquified cinnamon into the rolls, the individual rolls being severed by a horizontally reciprocated knife as the dough is expressed through dough discharge outlets, the amount of flavoring being easily adjustable and the entire assembly being capable of adaptation as an accessory assembly to replace the doughnut configuring means in machines constructed according to the above mentioned patents.

BRIEF DESCRIPTION OF THE DRAWINGS

FIG. 3 is a sectional view taken on line 3—3 of FIG. 1;

FIG. 4 is an enlarged sectional view taken on line 4—4 of FIG. 3; and

FIG. 5 is a further enlarged sectional view taken on line 5—5 of FIG. 4.

DETAILED DESCRIPTION OF THE PREFERRED EMBODIMENT

Figure 1:
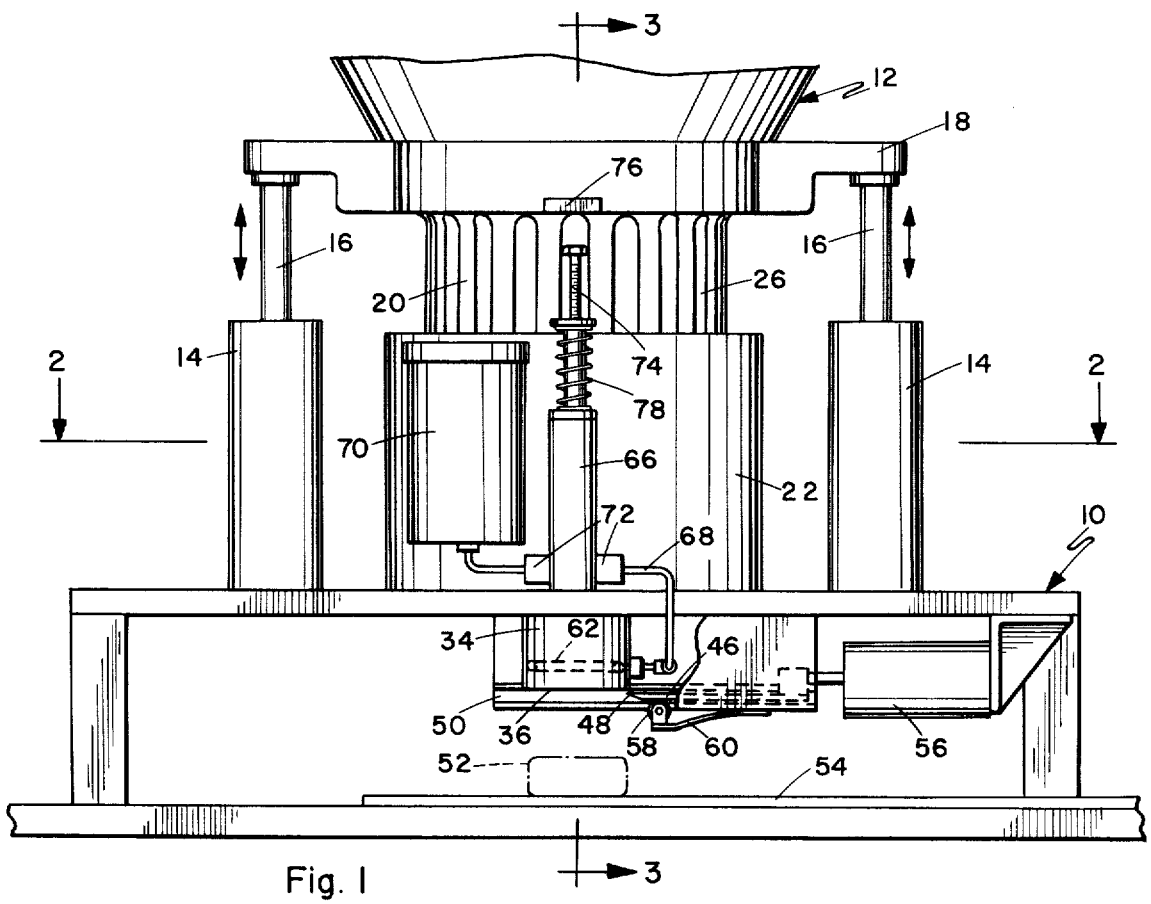
FIG. 1 is a side elevation view of the cinnamon roll making machine.
Figure 2:
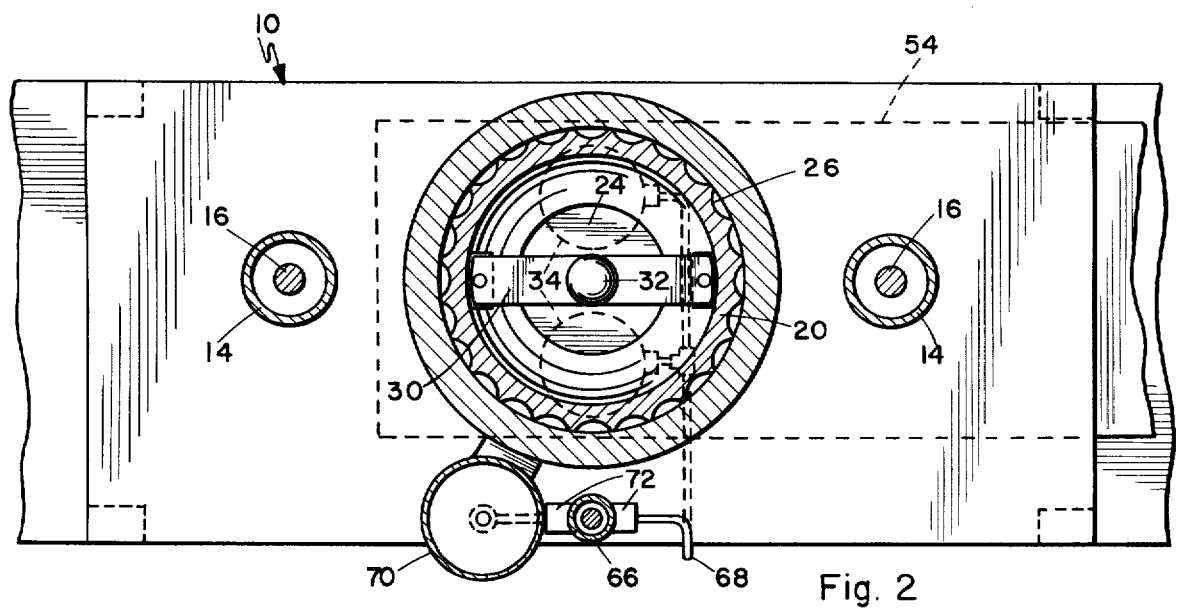
FIG. 2 is a sectional view taken on line 2—2 of FIG. 1.

As illustrated, the invention is adapted as a replacement accessory assembly for the doughnut configuring assembly of a machine similar to those disclosed in applicant's prior issued U.S. Pat. Nos. 2,905,110 and 3,286,661. The frame 10 is adapted to replace its counterpart in the patented devices, is separable from the hopper-piston assembly 12 for the dough which is not necessarily altered from that shown in the issued patents. No change from the patented structure, excepting their incorporation as a part of a new combination of elements in the claimed accessory assembly, is necessary in respect to the hydraulic cylinders 14 used to reciprocate the hopper-piston 12 but these are illustrated in FIGS. 1 and 2 to make the present description more readily intelligible. These hydraulic cylinders are shown mounted on the frame 10 with the piston elements 16 thereof connectable to a spider plate 18 fixed to the hopper-piston assembly 12. The pistons 16 are activated by hydraulic fluid or air to rythmically raise and lower the hopper-piston of assembly 12 so that the piston portion 20 reciprocates vertically within the fixed cylinder 22. Dough which has been previously conditioned according to well known procedures is charged into that hopper-piston 12 and is fed incrementally into the fixed cylinder 22 through a one-way valve 24 in the lower end of the hollow piston 20. The fluting 26 and piston ring follower 28 are useful in this invention to accomodate escape of gas bubbles from the dough but these features are not claimed herein as new per se, and the mounting arm means 30 for the valve 24 and its spring case 32 also represent prior art disclosed in the above mentioned co-owned prior patents.

In the lower end of the fixed cylinder 22 there is at least one and as illustrated there are two dough discharge tubular outlets 34 of tubular form having their lower ends 36 in a common plane, shown as horizontal. Within each tubular outlet 34 is a pass-through form means 38 comprising, as illustrated, a spiral strap fixed at at 40 to the inner surface of the tubular outlet 34. The inner ends of the spiral straps are fixed to support spindles 42 which are mounted axially of the tubular discharge outlets by diametrically extending arms 44, illustrated in FIG. 3.

A cut-off means is provided in the form of a knife 46 having a leading edge 38 and horizontally slidably mounted on rails 50 so as to cleave the formed extruded dough along at the horizontal plane 36. In a machine with a plurality of discharge outlets as shown a single knife 46 cuts off a similar number of "rolls" 52 of dough at each thrust of the knife and these rolls 52 fall by gravity onto a removable pallet 54 or, if desired, onto a moving belt, not shown, having the equivalent function of removing the cut-off rolls for the necessary baking process. The knife 46 is reciprocated by a hydraulic or pneumatic cylinder 56 supported on the frame 10 and a pair of rollers 58, spring biased upwardly as at 60 against the lower side edges of the knife 46 assure clean cleavage of the dough.

In making cinnamon rolls a flavoring material is added with the greatest concentration thereof along the spiral depression in the roll 52 formed by the spiral strap 38 and this is accomplished by forcing the flavoring material in fluid or semi-fluid form into a distributing tube 62, shown best in FIG. 5, in the upper edge of each spiral strap. The distributing tubes 62 are perforated as at 64 to permit egress of the fluidized material and a force pump 66 is inserted in the fluid line 68 leading from a supply tank 70 to the distributing tubes 62 with the necessary one-way valves diagrammatically illustrated at 72 and an adjustable stroke means such as that indicated at 74 as a simple extensible piston actuator spindle which is depressed by a lip 76 on the hopper-piston assembly 12 on the dough compression stroke of the assembly 12. A spring 78 can be made to return the piston of the pump 66. The operation of the machine will be clear from the foregoing description and it will be understood that the dough will be preconditioned before being changed into the hopper-piston 12, and the rolls 52 will ordinarily be considerably smaller, usually about one-half size, than the finished baked product, so that the pallot or belt 54 need not be bulky. The configuration and dimensioning of the discharger outlets 34 and pass-through form means 38 may vary considerably but a satisfactory spiral strap for making ordinary cinnamon rolls may be two inches in outside diameter and approximately one inch in vertical dimension.

I claim:
1. A machine for making cinnamon rolls and the like comprising:
   a dough hopper;
   a hollow piston having an open end connected to said hopper and the outer end having one-way means therein;
   a fixed cylinder operatively within which said piston is mounted, said cylinder having a substantially closed end with at least one open bottomed dough discharge outlet therein;
   spiral pass-through form means operatively mounted in said discharge outlet to receive and form dough expressed therethrough in a spiral shape;
   said spiral means comprising a rigid planar spiral strap having a lower edge defining a plane coincident with the bottom of said dough discharge outlet, and an apertured fluid distribution tube integral with the upper edge of said strap;
   means to inject flavored fluid into said fluid distribution tube;
   means to reciprocate said hopper and piston relative to said fixed cylinder, whereby dough is expressed through said spiral form means; and
   cut-off means operatively mounted to move across said discharge outlet and the lower edge of said spiral form means for periodically cutting off dough expressed through said spiral form means, whereby said strap serves as a positioning wall to maintain the shape of the expressed dough while cutting.

2. A machine according to claim 1 wherein said fixed cylinder, pass-through form means, means to reciprocate, and means to inject are connected together as parts of a unitary removable assembly.

3. A machine according to claim 2 and wherein said cut-off means is also connected as a part of said removable assembly.

* * * * *